United States Patent
Sugimoto et al.

(10) Patent No.: US 10,982,040 B2
(45) Date of Patent: Apr. 20, 2021

(54) EPOXY RESIN, EPOXY RESIN COMPOSITION INCLUDING SAME, AND CURED PRODUCT USING SAID EPOXY RESIN COMPOSITION

(71) Applicant: DIC Corporation, Tokyo (JP)

(72) Inventors: Nana Sugimoto, Ichihara (JP); Koji Hayashi, Ichihara (JP); Kunihiro Morinaga, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/630,915

(22) PCT Filed: Mar. 29, 2018

(86) PCT No.: PCT/JP2018/013158
§ 371 (c)(1),
(2) Date: Jan. 14, 2020

(87) PCT Pub. No.: WO2019/017013
PCT Pub. Date: Jan. 24, 2019

(65) Prior Publication Data
US 2020/0231741 A1    Jul. 23, 2020

(30) Foreign Application Priority Data
Jul. 21, 2017   (JP) .............................. JP2017-141810

(51) Int. Cl.
*C08G 59/06* (2006.01)
*C08G 59/32* (2006.01)

(52) U.S. Cl.
CPC ........... *C08G 59/06* (2013.01); *C08G 59/063* (2013.01); *C08G 59/3218* (2013.01)

(58) Field of Classification Search
None
See application file for complete search history.

(56) References Cited

U.S. PATENT DOCUMENTS

2020/0308393 A1* 10/2020 Hayashi ................ C08G 59/10

FOREIGN PATENT DOCUMENTS

SU           326197 A  *  1/1972

OTHER PUBLICATIONS

Derwent abstract of SU 326197 A. (Year: 2020).*
C. Aouf et al., "Study of the O-glycidylation of natural phenolic compounds. The relationship between the phenolic structure and the reaction mechanisin," Tetrahedron, vol. 69, 2013, pp. 1345-1353. (discussed in the spec & cited in the ISR).
International Search Report dated Jun. 12, 2018, issued for PCT/JP2018/013158.

* cited by examiner

*Primary Examiner* — Michael J Feely
(74) *Attorney, Agent, or Firm* — Locke Lord LLP

(57) ABSTRACT

The present invention provides an epoxy resin including a reaction product of 1,2,3-trihydroxybenzene and an epihalohydrin, the epoxy resin containing a cyclic compound that has acyclic structure containing, as constitutional atoms, two adjacent oxygen atoms derived from 1,2,3-trihydroxybenzene, the cyclic compound being contained in an amount of 0.040 to 0.115 mol based on 100 g of the epoxy resin. The epoxy resin can be an alternative as a biobased polymer, is liquid, and is excellent in thermal resistance.

6 Claims, 1 Drawing Sheet

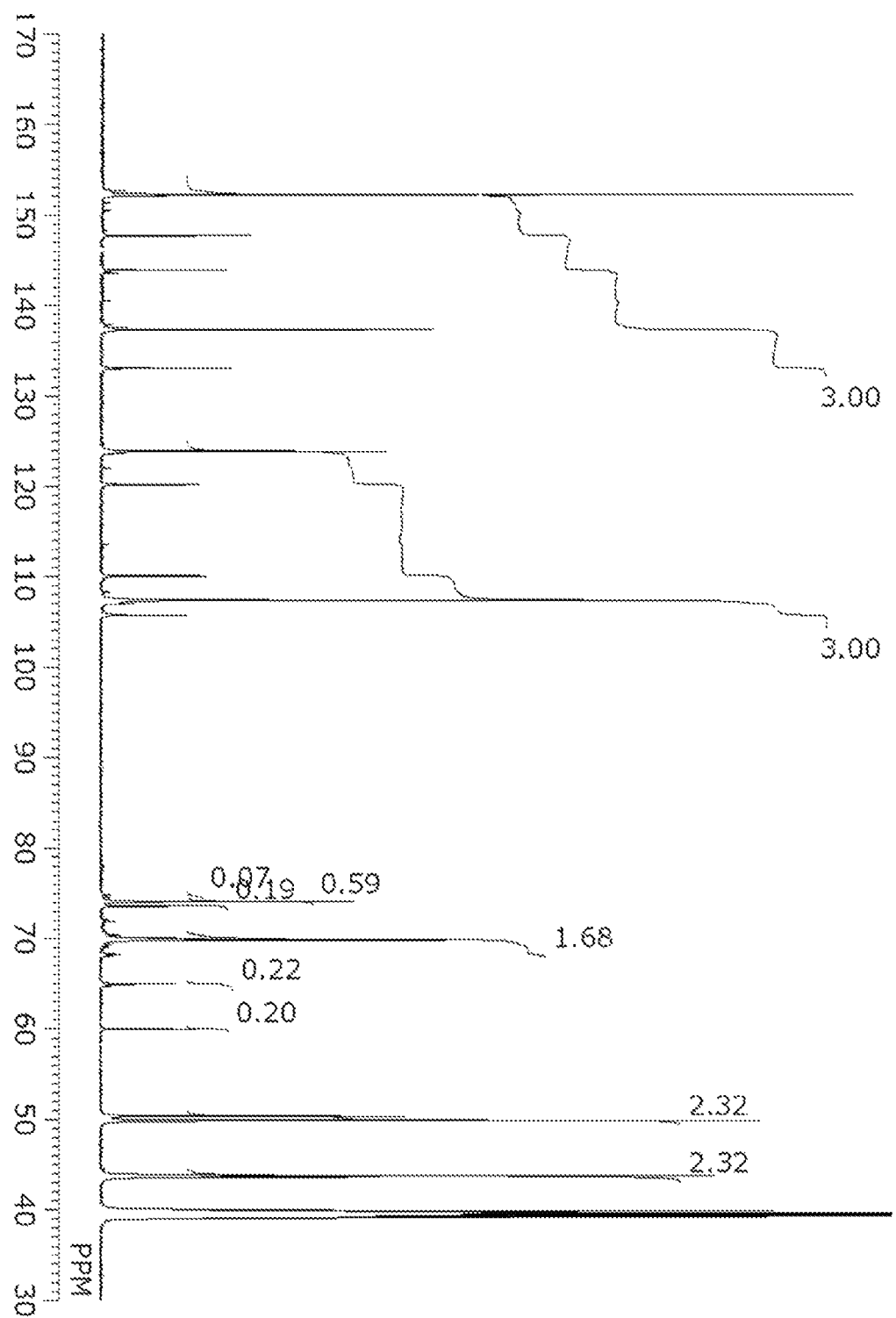

EPOXY RESIN, EPOXY RESIN COMPOSITION INCLUDING SAME, AND CURED PRODUCT USING SAID EPOXY RESIN COMPOSITION

TECHNICAL FIELD

The present invention relates to an epoxy resin, an epoxy resin composition containing the same, and a cured product produced by using the epoxy resin composition.

BACKGROUND ART

Epoxy resin is a curable resin that contains epoxy groups in its molecule and can be cured with a crosslinked network formed by the epoxy groups. Cured products of epoxy resins are excellent in mechanical strength, thermal resistance, water resistance, insulation properties, and the like, and thus are widely used in a matrix for a fiber-reinforced composite material, a heat dissipation member, an adhesive, a paint, a semiconductor, a printed circuit board, and other applications.

Thus, epoxy resin is one of the most important curable resins. Many of currently used epoxy resins are based on the diglycidyl ether form of bisphenol A and bisphenol A which is a raw material thereof is typically synthesized by reacting phenol and acetone in the presence of a catalyst.

Meanwhile, in the recent years, biobased polymers have attracted attentions from the viewpoints of the increased focus on the environment, the concern about depletion of petroleum resources, and the like. Also as for the epoxy resin, various studies have been made about an alternative to the diglycidyl ether form of bisphenol A.

For example, NPL 1 suggests use of a natural aromatic compound, in particular, a tannin as an alternative to the diglycidyl ether form of bisphenol A. For example, it is stated that an epoxy resin produced by reacting catechin or gallic acid with epichlorohydrin can be used as an alternative to the diglycidyl ether form of bisphenol A.

Note that NPL 1 states, for example, that there is recognized a difference in the reactivity between a reaction of catechin with epichlorohydrin and a reaction of gallic acid with epichlorohydrin, that an object is to study an action of phase transfer catalyst (PTC) used in a reaction and optimum conditions of a functionalizing reaction of a tannin, and that the mechanism of glycidylation is investigated in the above study by using 4-mechylcatechol, gallic acid, protocatechuic acid, pyrogallol, and resorcinol.

For example, it is stated that when pyrogallol is reacted with epichlorohydrin, a mixture that contains two products difficult to separate is obtained, and that the two products here are the triglycidyl ether form of pyrogallol and a benzodioxane derivative, the ratio of the two products produced being 1:1.

CITATION LIST

Non Patent Literature

NPL 1: Tetrahedron, 2013, 69, 1345-1353

SUMMARY OF INVENTION

Technical Problem

NPL 1 describes a study about a functionalizing reaction of a tannin or the like, but has no description about evaluation of physical properties performed using the resulting epoxy resin. In actual examinations of the physical properties, it was found that sufficient thermal resistance is sometimes not provided.

Thus, from the viewpoint of increasing the thermal resistance, it is conceived to purify the epoxy resin described in NPL 1. It was however found that, since the triglycidyl form of pyrogallol is a crystal compound, an epoxy resin is sometimes obtained in a solid form through purification and may be poor in handleability.

Thus, an object of the present invention is to provide an epoxy resin that can be an alternative as a biobased polymer and that is liquid and is excellent in thermal resistance.

Solution to Problem

The present inventors have intensively and extensively studied for solving the above problem. As a result, they have found that the above problem can be solved by, focusing on an epoxy resin produced by using pyrogallol (1,2,3-trihydroxybenzene), controlling the content of a particular compound that may be contained in the epoxy resin, completing the present invention.

Specifically, the present invention relates to an epoxy resin including a reaction product of 1,2,3-trihydroxybenzene and an epihalohydrin. Here, the invention is characterized in that the epoxy resin contains a cyclic compound that has a cyclic structure containing, as constitutional atoms, two adjacent oxygen atoms derived from 1,2,3-trihydroxybenzene, the cyclic compound being contained in an amount of 0.040 to 0.115 mol based on 100 g of the epoxy resin.

Advantageous Effects of Invention

The present invention can provide an epoxy resin that can be an alternative as a biobased polymer and that is liquid and is excellent in thermal resistance.

BRIEF DESCRIPTION OF DRAWING

FIG. 1 It is a $^{13}$C NMR chart of an epoxy resin produced in Example 1.

DESCRIPTION OF EMBODIMENTS

An embodiment of the present invention will be described in detail below.

<Epoxy Resin>

An epoxy resin according to this embodiment is a reaction product of 1,2,3-trihydroxybenzene (herein also referred to as "pyrogallol") and an epihalohydrin.

When pyrogallol is reacted with an epihalohydrin, a glycidylation reaction typically proceeds on hydroxy groups at the 1-position, the 2-position, and the 3-position of pyrogallol to produce the triglycidyl ether form. However, various other reactions may proceed, and as a result, the reaction product of pyrogallol and an epihalohydrin may contain various epoxy compounds. Physical properties of the epoxy resin as such a reaction product and physical properties of a cured product thereof may be influenced by not only the triglycidyl ether form of pyrogallol but also by other compounds contained therein.

For example, NPL 1 states, as described above, that a reaction product of pyrogallol and an epihalohydrin is obtained as a 1:1 mixture of the triglycidyl ether form of pyrogallol and a cyclic compound (benzodioxane derivative). When physical properties of a cured product of the epoxy resin described in NPL 1 are evaluated, it was found that sufficient thermal resistance were not recognized. Specifically, the functional group concentration in the epoxy resin is low and a cured product having good thermal resistance can not be obtained.

Thus, in order to enhance the thermal resistance, the epoxy resin described in NPL 1 was purified to prepare the triglycidyl ether form of pyrogallol that contains no or a small amount of impurities. Then, it was found that the epoxy resin is obtained in a solid form since the triglycidyl ether form of pyrogallol is a crystalline compound, which may result in poor handleability.

In contrast, in the epoxy resin according to this embodiment, focusing on a certain cyclic compound which may be contained in a reaction product, the content of the cyclic compound is controlled. Accordingly, the resulting cured product is excellent in thermal resistance. In addition, the epoxy resin according to this embodiment contains a particular cyclic compound, and the form is liquid and is excellent in handleability. Furthermore, since the epoxy resin according to this embodiment is a reaction product produced by using pyrogallol, the epoxy resin can be an alternative as a biobased polymer.

1,2,3-Trihydroxybenzene (Pyrogallol)

Pyrogallol has a structure represented by the following chemical formula.

[Chem. 1]

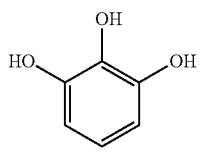

Pyrogallol is obtained by decarboxylation of gallic acid (3, 4, 5-trihydroxybenzoic acid) which is contained in plants. The pyrogallol used herein is preferably a bio-based pyrogallol from the viewpoints of small burden on the environment and availability. Note that an industrially synthesized pyrogallol may be used.

[Epihalohydrin]

The epihalohydrin is not particularly limited, but examples thereof include epichlorohydrin, epibromohydrin, β-methylepichlorohydrin, and β-methylepibromohydrin. The epihalohydrins may be used alone or in combination of two or more thereof.

The amount of the epihalohydrin used is not particularly limited, but preferably 1.2 to 20 mol and more preferably 1.5 to 10 mol based on 1 mol of the hydroxy group in pyrogallol. When the amount of the epihalohydrin used is 1.2 mol or more, other compounds that may be contained in the epoxy resin are easily controlled, and thus such an amount is preferred. On the other hand, when the amount of the epihalohydrin used is 20 mol or less, the cost is lowered from the viewpoint of the yield, and thus such an amount is preferred.

[Reaction]

The process of the reaction of pyrogallol and an epihalohydrin is not particularly limited, and the reaction may be performed by any known process. In one embodiment, a process of the reaction includes a step (1) of subjecting a mixture containing pyrogallol and an epihalohydrin to a reaction in the presence of a quaternary onium salt and/or a basic compound and a step (2) of subjecting a reaction product obtained in the step (1) to a ring-closing reaction in the presence of a basic compound.

(Step (1))

The step (1) is a step of subjecting a mixture containing pyrogallol and an epihalohydrin to a reaction in the presence of a quaternary onium salt and/or a basic compound.

Mixture

The mixture contains pyrogallol and an epihalohydrin. Besides them, the mixture may contain a reaction solvent or the like as required.

Pyrogallol and Epihalohydrin

The pyrogallol and the epihalohydrin are as described above and thus the explanation is omitted here.

Reaction Solvent

The reaction solvent is not particularly limited, but examples thereof include an alcohol, such as methanol, ethanol, isopropyl alcohol, or butanol; a ketone, such as acetone or methyl ethyl ketone; an ether, such as dioxane; dimethyl sulfone; and dimethyl sulfoxide. The reaction solvents may be used alone or in combination of two or more thereof.

When a reaction solvent is used, the amount of the solvent added is preferably 5 to 150 parts based on 100 parts of the epihalohydrin, more preferably 7.5 to 100 parts, and further preferably 10 to 50 parts.

Quaternary Onium Salt

The quaternary onium salt has the function of promoting the reaction in the step (1) described later.

The quaternary onium salt is not particularly limited, but examples thereof include a quaternary ammonium salt and a quaternary phosphonium salt.

The quaternary ammonium salt is not particularly limited, but examples thereof include chloride salts of a tetramethylammonium cation, a methyltriethylammonium cation, a tetraethylammonium cation, a tributylmethylammonium cation, a tetrabutylammonium cation, a phenyltrimethylammonium cation, a benzyltrimethylammonium cation, a phenyltriethylammonium cation, a benzyltriethylammonium cation, and a benzyltributylammonium cation, and bromide salts of a tetramethylammonium cation, a trimethylpropylammonium cation, a tetraethylammonium cation, and a tetrabutylammonium cation.

The quaternary phosphonium salt is not particularly limited, but examples thereof include bromide salts of a tetraethylphosphonium cation, a tetrabutylphosphonium cation, a methyltriphenylphosphonium cation, a tetraphenylphosphonium cation, an ethyltriphenylphosphonium cation, a butyltriphenylphosphonium cation, and a benzyltriphenylphosphonium cation.

Among them, a chloride salt of a tetramethylammonium cation, a benzyltrimethylammonium cation, or a benzyltriethylammonium cation, or a bromide salt of a tetrabutylammonium cation is preferably used as a quaternary onium salt.

Note that the above-mentioned quaternary onium salts may be used alone or in combination of two or more thereof.

The amount of the quaternary onium salt added is preferably 0.15 to 5% by mass based on the total mass of the pyrogallol and the epihalohydrin, and more preferably 0.18 to 3% by mass. When the amount of the quaternary onium salt added is 0.15% by mass or more, the reaction in the step (1) may suitably proceed, and thus such an amount is preferred. On the other hand, when the amount of the quaternary onium salt added is 5% by mass or less, the amount of the residue in the resin can be reduced, and thus such an amount is preferred.

Basic Compound

The basic compound also has the function of promoting the reaction in the step (1) described later as with the quaternary onium salt.

The basic compound is not particularly limited, but examples thereof include potassium hydroxide, sodium hydroxide, barium hydroxide, magnesium hydroxide, sodium carbonate, and potassium carbonate. Among them, potassium hydroxide or sodium hydroxide is preferably used. Note that the basic compounds may be used alone or in combination of two or more thereof.

The amount of the basic compound added is not particularly limited, but is preferably 0.01 to 0.3 mol per mole of the phenolic hydroxy group in the pyrogallol, and more preferably 0.02 to 0.2 mol. When the amount of the basic compound added is 0.01 mol or more, the reaction in the step (2) described later may suitably proceed, and thus such an amount is preferred. On the other hand, when the amount of the basic compound added is 0.3 mol or less, side reactions can be prevented or suppressed, and thus such an amount is preferred.

The quaternary onium salts and the basic compounds may be used alone or in combination.

Reaction in Step (1)

The reaction in the step (1) mainly includes a reaction in which the hydroxy groups in pyrogallol react with an epihalohydrin to produce a tris(3-halogeno-2-hydroxypropyl ether) intermediate as shown below.

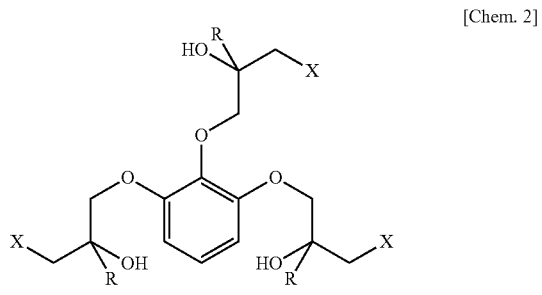

[Chem. 2]

Note that, in the above formula, "X's" each independently represent a halogen atom. In addition, "R's" each independently represent a hydrogen atom or a methyl group.

The reaction temperature in the step (1) is not particularly limited, but is preferably 20 to 80° C. and more preferably 40 to 75° C. When the reaction temperature in the step (1) is 20° C. or higher, the reaction in the step (1) may suitably proceed, and thus such a reaction temperature is preferred. On the other hand, when the reaction temperature in the step (1) is 80° C. or lower, side reactions can be prevented or suppressed, and thus such a reaction temperature is preferred.

Furthermore, the reaction time in the step (1) is not particularly limited, but is preferably 0.5 hours or longer and more preferably 1 to 50 hours. When the reaction time in the step (1) is 0.5 hours or longer, the reaction suitably proceeds and side reactions can be prevented or suppressed, and thus such a reaction time is preferred.

(Step (2))

The step (2) is a step of subjecting a reaction product obtained in the step (1) to a ring-closing reaction in the presence of a basic compound.

Reaction Product Obtained in Step (1)

The reaction product obtained in the step (1) contains the tris(3-halogeno-2-hydroxypropyl ether) intermediate obtained by a first reaction. Besides them, a first by-product, the pyrogallol unreacted, the epihalohydrin unreacted, a reaction solvent, and impurities may be contained.

Basic Compound

The basic compound has the function of making the reaction condition in the step (2) into a basic condition and to promote a ring-closing reaction.

The basic compound is not particularly limited, but examples thereof include potassium hydroxide, sodium hydroxide, barium hydroxide, magnesium hydroxide, sodium carbonate, and potassium carbonate. Among them, potassium hydroxide or sodium hydroxide is preferably used. Note that the basic compounds may be used alone or in combination of two or more thereof.

The amount of the basic compound added is not particularly limited, but is preferably 0.8 to 1.5 mol per mole of the phenolic hydroxy group in the pyrogallol, and more preferably 0.9 to 1.3 mol. When the amount of the basic compound added is 0.8 mol or more, the ring-closing reaction in the step (2) may suitably proceed, and thus such an amount is preferred. On the other hand, when the amount of the basic compound added is 1.5 mol or less, side reactions can be prevented or suppressed, and thus such an amount is preferred. Note that, when a basic compound is used in the step (1), the amount mentioned above is preferably the total amount including the amount of the basic compound used in the step (1).

Reaction in Step (2)

The reaction in the step (2) mainly includes a reaction in which the 3-halogeno-2-hydroxypropyl ether groups in the tris(3-halogeno-2-hydroxypropyl ether) intermediate undergo a glycidylation reaction under a basic condition to provide a triglycidyl form of pyrogallol as shown below.

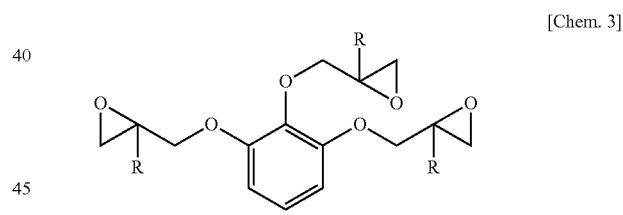

[Chem. 3]

Note that, in the above formula, "R's" each independently represent a hydrogen atom or a methyl group.

The reaction temperature in the step (2) is not particularly limited, but is preferably 30 to 120° C. and more preferably 25 to 80° C.

Furthermore, the reaction time in the step (2) is not particularly limited, but is preferably 0.5 to 4 hours and more preferably 1 to 3 hours.

Note that a further step of purification may be used to allow the reaction in the step (2) to suitably proceed.

Furthermore, after the step (2) is performed, the resulting reaction product may be subjected to purification or the like as needed.

[Reaction Product]

The reaction product contains a cyclic compound having a cyclic structure that contains two adjacent oxygen atoms derived from 1,2,3-trihydroxybenzene as constitutional atoms. In addition, the reaction product typically contains 1,2,3-triglycidyloxybenzene (herein also referred to as a "triglycidyl form of pyrogallol"). Besides them, an oligomer, another glycidyl form, a solvent, and another compound may further be contained.

Note that, in an embodiment, since the reaction product contains the triglycidyl form of pyrogallol, the epoxy resin may have desirable physical properties. Specifically, the triglycidyl form of pyrogallol has three glycidyl forms. Thus, the degree of crosslinking is high and a cured product excellent in thermal resistance can be provided. In addition, in the triglycidyl form of pyrogallol, three glycidyl forms are adjacent to each other. The adjacent glycidyl groups are tightly packed upon a crosslinking reaction to provide a cured product excellent in elastic modulus.

In addition, in an embodiment, cyclic compounds, oligomers, and the like contained in the reaction product are produced as a result of side reactions of the glycidylation reaction of 1,2,3-trihydroxybenzene, and as described above, the cyclic compounds, the oligomers, and the like may have an influence on the physical properties of the epoxy resin or the physical properties of a cured product thereof.

In this case, the side reactions can be controlled by regulating the reaction conditions. In this manner, not only the content of the triglycidyl form of 1,2,3-trihydroxybenzene but also the content of the cyclic compounds, the oligomers, and the like can be controlled.

For example, the step (1) provides a tris(3-halogeno-2-hydroxypropyl ether) intermediate as described above, but depending on the reaction conditions, a side reaction of partially closing the 3-halogeno-2-hydroxypropyl ether groups may occur to produce an intermediate having a glycidyl group(s) and a hydroxy group(s). In this case, when such an intermediate produced by a side reaction undergoes an intermolecular reaction, a cyclic compound is produced, while when such an intermediate undergoes an intermolecular reaction, an oligomer is produced. Thus, when a side reaction to produce an intermediate having a glycidyl group(s) and a hydroxy group(s) is controlled in the step (1), the amounts of the cyclic compound and the oligomer tend to be able to be controlled. For example, when the step (1) is performed under a high temperature condition, the side reaction to produce a glycidyl group is promoted and the amounts of the cyclic compound and the oligomer in the obtained reaction product may be high values. On the other hand, when the step (1) is performed under a low temperature condition, the reaction to produce a glycidyl group is relatively suppressed and the amounts of the cyclic compound and the oligomer in the obtained reaction product may be low values. In addition, when the step (1) is performed in a short time, many unreacted hydroxy groups remain and react with glycidyl groups produced in the step (2), whereby the amounts of the cyclic compound and the oligomer in the reaction product may be high values.

Note that the content of each component in the reaction product can be controlled by various method. For example, the reaction can be controlled by controlling the amount of 1,2,3-trihydroxybenzene added, the kind and amount of the epihalohydrin added, the kinds and amounts of the quaternary onium salt and the basic compound added, the reaction temperature, the reaction time, etc. in the step (1) described above. In addition, the reaction can also be controlled by adding or removing raw materials, products, and the like in the step (1). Furthermore, the reaction can be controlled by adjusting the kind and amount of the basic compound added, the reaction temperature, the reaction time, the reaction rate, etc. in the step (2) described above. In addition, the reaction may be controlled by, for example, adding or removing products, etc. in the step (2). As a result, the content of each component in the reaction product can be controlled.

1,2,3-Triglycidyloxybenzene (Triglycidyl Form of Pyrogallol)

1,2,3-Triglycidyloxybenzene has the following structure.

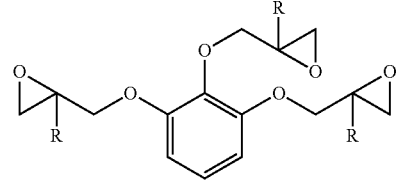

[Chem. 4]

Note that, in the above formula, "R's" each independently represent a hydrogen atom or a methyl group.

The content of 1,2,3-triglycidyloxybenzene is preferably 55% or more in terms of the proportion of the area in a gel permeation chromatography (GPC) measurement, more preferably 65% or more, further preferably 70% or more, particularly preferably 78% or more, and most preferably 80 to 95%. When the content of 1,2,3-triglycidyloxybenzene is 55% or more in terms of the proportion of the area in a GPC measurement, the thermal resistance and mechanical strength may be enhanced, and thus such a content is preferred. Note that the "proportion of the area in a GPC measurement" herein means the proportion of the area occupied by a subject compound in a GPC chart obtained by a GPC measurement of a reaction product. As a specific measurement method, a method described in Examples is employed.

(Cyclic Compound)

The cyclic compound is a compound having a cyclic structure that contains two adjacent oxygen atoms derived from 1,2,3-trihydroxybenzene as constitutional atoms. Here, an example of the cyclic structure that contains two adjacent oxygen atoms derived from 1,2,3-trihydroxybenzene as constitutional atoms is a benzodioxane structure which is a condensed structure with a benzene ring. When an epoxy resin contains the cyclic compound in a certain amount (0.040 to 0.115 mol based on 100 g of an epoxy resin), the epoxy resin is liquid and is thus excellent in handleability and workability, and can provide a cured product excellent in thermal resistance.

The cyclic compound is not particularly limited, but specific examples thereof include the compounds shown below and compounds obtained by further reacting such a compound with an epihalohydrin.

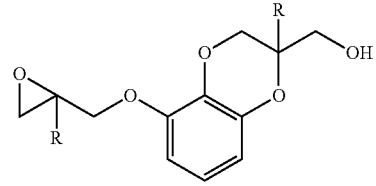

[Chem. 5]

-continued

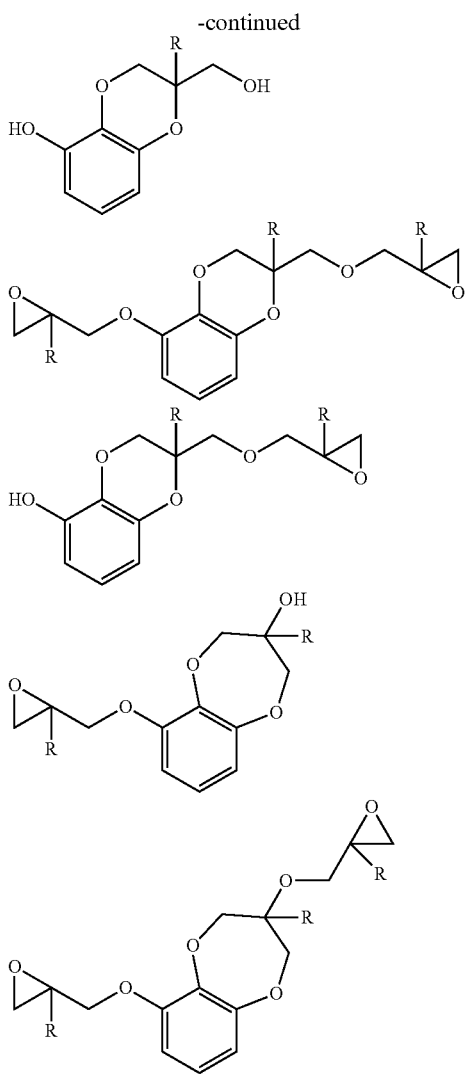

Note that, in the above formulae, "R's" each independently represent a hydrogen atom or a methyl group.

The above-mentioned cyclic compounds may be contained alone or in combination of two or more thereof.

The content of the cyclic compound is 0.040 to 0.115 mol based on 100 g of the epoxy resin, preferably 0.050 to 0.115 mol, and more preferably 0.070 to 0.115 mol. When the content of the cyclic compound is more than 0.115 mol, suitable thermal resistance cannot be obtained in a resulting cured product. On the other hand, when the content of the cyclic compound is less than 0.040 mol, the epoxy resin is crystallized and is poor in handleability. Note that, as the "content of the cyclic compound" herein, a value measured by a method described in Examples is employed. In addition, when two or more cyclic compounds are contained, the "content of the cyclic compound" means the total content thereof.

Note that the content of the cyclic compound can be adjusted by controlling the reaction as described above. Such adjustment of the content of the cyclic compound can be achieved, for example, by appropriately adjusting the amount of 1,2,3-trihydroxybenzene added, the kind and amount of the epihalohydrin added, the kinds and amounts of the quaternary onium salt and the basic compound added, the reaction temperature, the reaction time, etc. in the step (1) described above. In addition, the adjustment can also be achieved by adding or removing raw materials, products, etc. in the step (1). Furthermore, the adjustment can be achieved by appropriately adjusting the kind and amount of the basic compound added, the reaction temperature, the reaction time, the reaction rate, etc. in the step (2) described above. In addition, the adjustment can be achieved by adding or removing products, etc. in the step (2).

(Oligomer)

The reaction product may contain an oligomer. Note that the "oligomer" herein means a compound obtained by reacting molecules of pyrogallol or a derivative thereof to each other. Thus, it can also be said that an oligomer has a structure having a plurality of pyrogallol backbones.

The oligomer is not particularly limited, and examples thereof include oligomers produced by a reaction of one or two or more of the tris(3-halogeno-2-hydroxypropyl ether) intermediate, a bis(3-halogeno-2-hydroxypropyl ether) intermediate, and a mono(3-halogeno-2-hydroxypropyl ether) intermediate obtained by the step (1) described above; and oligomers produced by a reaction of a bi- or higher-functional epoxy compound, such as 1,2,3-triglycidyloxybenzene, and a bi- or higher-functional polyhydric phenol, such as pyrogallol.

The above-mentioned oligomers may be contained alone or in combination of two or more thereof.

The content of the oligomer is preferably 12% or less, more preferably 10% or less, further preferably 7% or less, particularly preferably 3.1% or less, and most preferably 0.05 to 3.0%, which is determined as the proportion of an area in GPC measurement. When the content of the oligomer is 12% or less, the viscosity of the epoxy resin may be decreased and its handleability may be increased, and thus such a content is preferred. Note that, when two or more oligomers are contained, the "content of the oligomer" means the total content thereof.

The adjustment of the content of oligomer may also be achieved by appropriately adjusting the amount of pyrogallol added, the kind and amount of the epihalohydrin added, the kinds and amounts of the quaternary onium compound and the basic compound added, the reaction temperature, the reaction time, etc. in the step (1) as with the case of the cyclic compound.

(Another Glycidyl Form)

The reaction product may contain another glycidyl form. Another glycidyl form means a compound having a glycidyl group except for 1,2,3-triglycidyloxybenzene, the cyclic compounds, and the oligomers.

Examples of the other glycidyl forms include diglycidyl forms of pyrogallol and monoglycidyl forms of pyrogallol represented by the following structures, and derivatives thereof. Here, the "derivative" means a compound obtained by reacting a glycidyl group (s) in a diglycidyl form of pyrogallol or a monoglycidyl form of pyrogallol with an epihalohydrin through a ring-opening addition reaction.

[Chem. 6]

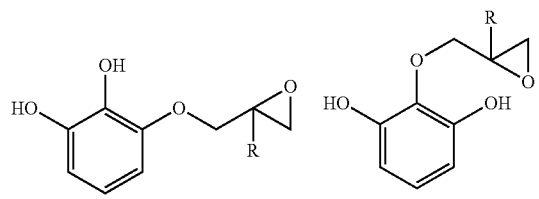

-continued

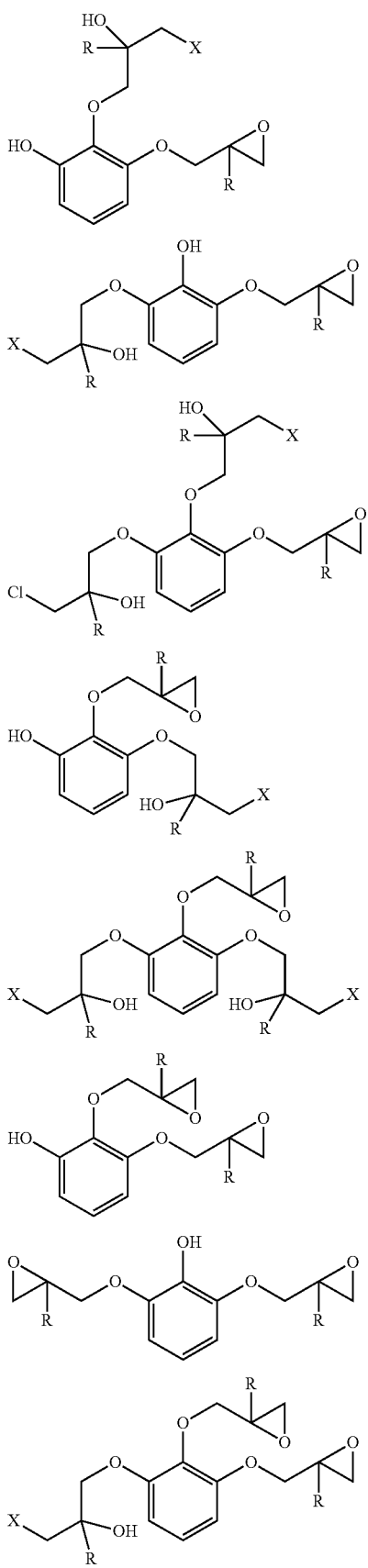

-continued

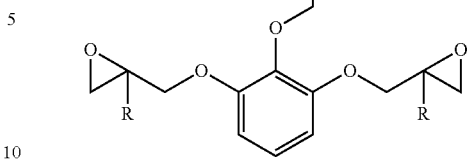

Note that, in the above formulae, "X's" each independently represent a halogen atom. In addition, "R's" each independently represent a hydrogen atom or a methyl group.

The above-mentioned other glycidyl forms may be contained alone or in combination of two or more thereof.

(Solvent)

The solvent is not particularly limited, but examples thereof include, in addition to the reaction solvent mentioned above, water, a solvent, and the like which may be purposely added in a purification step or the like.

The content of the solvent is preferably 5 parts by mass or less based on 100 parts by mass of the solid amount in an epoxy resin, and more preferably 1 part by mass or less. Note that the "solid amount in an epoxy resin" herein means the total mass of the components in the epoxy resin except for the solvent. Thus, when the epoxy resin contains no solvent, the total mass of the epoxy resin is equal to the solid amount.

(Another Compound)

Another compound is not particularly limited, and examples thereof include compounds except for the products produced in the reaction of pyrogallol and the epihalohydrin. Specific examples thereof include the pyrogallol unreacted, the epihalohydrin unreacted, the quaternary onium salt unreacted, the basic compound unreacted, and compounds derived therefrom (byproducts, etc.).

Note that, since control of reaction conditions and purification are typically performed, the content of the other compound tends to be low.

The content of the other compound is preferably 5% by mass or less based on the solid amount of an epoxy resin, and more preferably 0.05 to 5% by mass.

[Configuration of Epoxy Resin]

The epoxy resin according to this embodiment is the reaction product described above.

The epoxy equivalent of the epoxy resin is preferably 170 g/eq or less, more preferably 150 g/eq or less, further preferably 130 g/eq or less, particularly preferably 125 g/eq or less, and most preferably 108 to 125 g/eq. When the epoxy equivalent of the epoxy resin is 170 g/eq or less, heat resistance may be increased, and thus such an epoxy equivalent is preferred. Note that, as a value of the "epoxy equivalent" herein, a value measured by a method described in Examples is employed.

The viscosity of the epoxy resin is not particularly limited, but is preferably 1500 to 20000 mPa·s and more preferably 2000 to 15000 mPa·s. When the viscosity of the epoxy resin is 1500 mPa·s or more, drip in molding can be suppressed, and thus such a viscosity is preferred. On the other hand, when the viscosity of the epoxy resin is 20000 mPa·s or less, the epoxy resin is excellent in infiltration ability, and thus such a viscosity is preferred. Note that, as a value of the "viscosity of the epoxy resin" herein, a value measured by a method described in Examples is employed.

The adjustment of the components and physical properties of the epoxy resin may be achieved by controlling the reaction, may be achieved by controlling a purification step, or may be achieved by separately adding a component. In this case, from the viewpoint of capable of effectively preparing the epoxy resin, the contents of components in the epoxy resin are preferably adjusted by controlling the reaction.

<Epoxy Resin Composition>

According to an embodiment of the present invention, an epoxy resin composition is provided. The epoxy resin composition contains the epoxy resin described above and a curing agent. Besides them, the epoxy resin composition may further contain another epoxy resin, another resin, a curing promoter, an organic solvent, an additive, or the like, as required

[Epoxy Resin]

As the epoxy resin, the epoxy resin described above may be used and therefore the explanation is omitted here.

The content of the epoxy resin is preferably 30 to 99% by mass based on the solid amount in the resin composition, and more preferably 40 to 97% by mass. When the content of the epoxy resin is 30% by mass or more, the performance of the epoxy resin is easily exhibited, and thus such a content is preferred. On the other hand, when the content of the epoxy resin is 99% by mass or less, a wide variety of curing agents can be selected, and thus such a content is preferred. Note that the "solid amount in a resin composition" means the total mass of the components in the composition except for a solvent described later. Accordingly, when the resin composition contains no solvent, the total mass of the composition is equal to the solid amount.

[Another Epoxy Resin]

Another epoxy resin is not particularly limited, but examples thereof include a bisphenol-type epoxy resin, such as a bisphenol A-type epoxy resin or a bisphenol F-type epoxy resin; a biphenyl-type epoxy resin, such as a biphenyl-type epoxy resin or a tetramethylbiphenyl-type epoxy resin; a novolac-type epoxy resin, such as a phenol novolac-type epoxy resin, a cresol novolac-type epoxy resin, a bisphenol A novolac-type epoxy resin, or a biphenyl novolac-type epoxy resin; a triphenylmethane-type epoxy resin; a tetraphenylethane-type epoxy resin; a dicyclopentadiene-phenol addition reaction-type epoxy resin; a phenol aralkyl-type epoxy resin; a naphthol novolac-type epoxy resin, a naphthol aralkyl-type epoxy resin, a naphthol-phenol co-condensation novolac-type epoxy resin, a naphthol-cresol co-condensation novolac-type epoxy resin, a diglycidyloxy naphthalene, and a phosphorus atom-containing epoxy resin.

The above-mentioned other epoxy resins may be used alone or in combination of two or more thereof.

[Another Resin]

Another resin means a resin other than the epoxy resin. The other resin may be a thermosetting resin or a thermoplastic resin. The other resin is not particularly limited, but specific examples thereof include a polycarbonate resin, a polyphenylene ether resin, a polyethylene terephthalate resin, a polybutylene terephthalate resin, a polyethylene resin, a polypropylene resin, a polyimide resin, a polyamideimide resin, a polyetherimide resin, a polyethersulfone resin, a polyketone resin, a polyetherketone resin, a polyetheretherketone resin, and a phenol resin. The above-mentioned other resins may be used alone or in combination of two or more thereof.

[Curing Agent]

The curing agent is not particularly limited, but examples thereof include an amine compound, an amide compound, an acid anhydride compound, and a phenol compound.

Examples of the amine compounds include ethylenediamine, diaminopropane, diaminobutane, diethylenetriamine, triethylenetetramine, 1,4-cyclohexanediamine, isophoronediamine, diaminodicyclohexylmethane, diaminodiphenylmethane, diaminodiphenyl sulfone, phenylenediamine, imidazole, a BF3-amine complex, dicyandiamide, and guanidine derivatives.

An example of the amide compound is a polyamide resin synthesized from the dimer of linolenic acid and ethylene diamine.

Examples of the acid anhydride compounds include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of the phenol compounds include a phenol novolac resin, a cresol novolac resin, an aromatic hydrocarbon formaldehyde resin-modified phenol resin, a dicyclopentadiene phenol-addition-type resin, a phenol aralkyl resin, an α-naphthol aralkyl resin, a β-naphthol aralkyl resin, a biphenyl aralkyl resin, a triphenylolmethane resin, a tetraphenylolethane resin, a naphthol novolac resin, a naphthol-phenol co-condensation novolac resin, a naphthol-cresol co-condensation novolac resin, and an aminotriazine-modified phenol resin which is a copolymer of an amino group-containing triazine compound (melamine, benzoguanamine, etc.), a phenol (phenol, cresol, etc.), and formaldehyde.

Among them, an amine compound or a phenol compound is preferably used, and a diaminodiphenyl sulfone, a phenol novolac resin, a cresol novolac resin, a phenol aralkyl resin, an α-naphthol aralkyl resin, a β-naphthol aralkyl resin, a biphenyl aralkyl resin, or an aminotriazine-modified phenol resin is more preferably used.

Note that the above-mentioned cured products may be used alone or in combination of two or more thereof.

The content of the curing agent is preferably 1 to 70% by mass based on the solid amount in the resin composition, and more preferably 3 to 60% by mass. When the content of the curing agent is 1% by mass or more, a wide variety of curing agents can be selected, and thus such a content is preferred. On the other hand, when the content of the curing agent is 70% by mass or less, the performance of the epoxy resin is easily exhibited, and thus such a content is preferred.

[Curing Promoter]

A curing promoter has the function of promoting curing. This can lead to reduction in the reaction time, prevention or reduction of the generation of an unreacted epoxy compound, and the like.

The curing promoter is not particularly limited, but examples thereof include a phosphorous compound, a tertiary amine, an imidazole, an organic acid metal salt, a Lewis acid, an amine complex, and a urea derivative. Among them, an imidazole is preferably used. Note that the curing promoters may be used alone or in combination of two or more thereof.

The content of the curing promoter is preferably 0.1 to 10% by mass based on the solid amount in the epoxy resin composition, and more preferably 0.5 to 5% by mass. When the content of the curing promoter is 0.1% by mass or more, curing can be promoted, and thus such a content is preferred.

On the other hand, when the content of the curing promoter is 10% by mass or less, the pot life can be increased, and thus such a content is preferred.

[Organic Solvent]

The organic solvent has the function of adjusting the viscosity of the epoxy resin composition. This may lead to improvement of, for example, the infiltration ability into a substrate.

The organic solvent is not particularly limited, but examples thereof include a ketone, such as acetone, methyl ethyl ketone, methyl isobutyl ketone, or cyclohexanone; an acetic acid ester, such as ethyl acetate, butyl acetate, cellosolve acetate, propylene glycol monomethyl ether acetate, carbitol acetate, ethyldiglycol acetate, or propylene glycol monomethyl ether acetate; an alcohol, such as isopropyl alcohol, butanol, cellosolve, or butyl carbitol; an aromatic hydrocarbon, such as toluene or xylene; and an amide, such as dimethyl formamide, dimethylacetamide, or N-methylpyrrolidone. Among them, an alcohol or a ketone is preferably used, and butanol or methyl ethyl ketone is more preferably used. Note that the solvents may be used alone or in combination of two or more thereof.

The content of the organic solvent is preferably 10 to 60 parts by mass based on 100 parts by mass of the solid amount in the epoxy resin composition, and more preferably 20 to 50 parts by mass. When the content of the organic solvent is 10 parts by mass or more, the viscosity can be decreased, and thus such a content is preferred. On the other hand, when the content of the organic solvent is 60 parts by mass or less, nonvolatile components can be reduced, and thus such a content is preferred.

[Additive]

The additive which may be contained in the epoxy resin composition is not particularly limited, but examples thereof include an inorganic filler, a reinforcing fiber, a flame retardant, a mold release agent, a pigment, an antioxidant, a UV absorber, a light stabilizer, an antistatic agent, and a conductivity imparting agent. The additives may be used alone or in combination of two or more thereof.

[Application]

In an embodiment, the epoxy resin composition can be applied in a fiber-reinforced composite material, a heat dissipation member, an adhesive, a paint, a semiconductor, a printed circuit board, or other applications.

<Cured Product>

According to an embodiment of the present invention, a cured product is provided. The cured product is obtained by curing the epoxy resin composition. The cured product has high heat resistance.

The form of the cured product is not particularly limited, and may be a sheet form or a form in which another material (fibrous reinforcing material, etc.) is impregnated with the cured product.

The glass transition point (Tg) of the cured product (Tg) is not particularly limited, but is preferably 160 to 350° C., more preferably 200 to 300° C., further preferably 210 to 275° C., and particularly preferably 230 to 250° C. When the glass transition point (Tg) is 160° C. or higher, the thermal resistance can be increased, and thus such a glass transition point is preferred. On the other hand, when the glass transition point (Tg) is 350° C. or lower, the cured product is excellent in toughness, and thus such a glass transition point is preferred. Note that, as a value of the "glass transition point (Tg)" herein, a value measured by a method described in Examples is employed.

The 5% weight reduction temperature of the cured product is not particularly limited, but is preferably 325° C. or higher, more preferably 330° C. or higher, further preferably 340° C. or higher, particularly preferably 345° C. or higher, and most preferably 345 to 400° C. When the 5% weight reduction temperature of the cured product is 325° C. or higher, the thermal resistance is high and influence of vaporization of the cyclic compound contained and the like are small, and thus such a 5% weight reduction temperature is preferred. Note that, as a value of the "5% weight reduction temperature" herein, a value measured by a method described in Examples is employed.

The curing temperature of the epoxy resin composition is preferably 50 to 250° C. and more preferably 70 to 200° C. When the curing temperature is 50° C. or higher, a curing reaction rapidly proceeds, and thus such a curing temperature is preferred. On the other hand, when the curing temperature is 250° C. or lower, the amount of the energy required in curing can be suppressed, and thus such a curing temperature is preferred.

EXAMPLES

The present invention will be described with reference to examples below, but the present invention is not to be limited to the description in the examples. Note that the expression, "parts", is used herein, but unless otherwise specified, it represents "parts by mass".

Note that GPC and $^{13}$C NMR were measured under the following conditions.

<GPC Measurement Conditions>

Measurement apparatus: "HLC-8220 GPC" manufactured by Tosoh Corporation,

Column: guard column "HXL-L" manufactured by Tosoh Corporation+"TSK-GEL G2000HXL" manufactured by Tosoh Corporation+"TSK-GEL G2000HXL" manufactured by Tosoh Corporation+"TSK-GEL G3000HXL" manufactured by Tosoh Corporation+"TSK-GEL G4000HXL" manufactured by Tosoh Corporation Detector: RI (differential refractive index detector)

Data processor: "GPC-8020 model II version 4.10" manufactured by Tosoh Corporation Measurement conditions: Column temperature: 40° C.

Eluent: tetrahydrofuran

Flow rate: 1.0 ml/min

Standard: the following monodispersed polystyrenes having known molecular weights were used according to the measurement manual of "GPC-8020 model II version 4.10".

(Polystyrenes Used)

"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation Sample: a solution in tetrahydrofuran of 1.0 mass % in terms of the resin solid amount was filtered through a microfilter (50 μl) to obtain a sample.

<Measurement Conditions of $^{13}$C-NMR>

Apparatus: JNM-ECA500 manufactured by JOEL

Measurement mode: inverse gated decoupling

Solvent: deuterated dimethyl sulfoxide

Pulse angle: 30° pulse

Sample concentration: 30 wt %
Number of integrations: 4000
Reference of chemical shift: peak of dimethyl sulfoxide: 39.5 ppm.

Example 1

<Production of Epoxy Resin>
(Step (1))
Into a flask equipped with a thermometer, a dropping funnel, a condenser, a nitrogen inlet tube, and a stirrer were added 126 g (1.00 mol) of 1,2,3-trihydroxybenzene and 1388 g (15 mol) of epichlorohydrin, and the mixture was heated to 50° C. Next, 11.2 g (0.06 mol) of benzyltrimethylammonium chloride was added and the mixture was stirred at 50° C. for 24 hours.
(Step (2))
To the reaction solution obtained in the step (1), 1000 mL of distilled water was poured, the mixture was stirred, and after allowing the mixture to stand, the supernatant was removed. Then, 318 g of a 48% aqueous sodium hydroxide solution was added dropwise over 2.5 hours and the mixture was stirred for 1 hour.
To the resulting solution, 400 mL of distilled water was poured and the solution was allowed to stand. The lower salt solution layer was removed and epichlorohydrin was collected by distillation at 120° C. Next, 500 g of methyl isobutyl ketone (MIBK) and 147 g of water were sequentially added and the solution was washed with water at 80° C. After removing the lower washing water layer, dehydration and filtration were performed, and the solvent, MIBK, was removed at 150° C. to thereby produce an epoxy resin. Note that, in visual observation of the obtained epoxy resin, the epoxy resin was liquid.
For the obtained epoxy resin, the content X (mol) of the cyclic compound in 100 g of the epoxy resin was measured. Specifically, the content was calculated using the following formula.

$$X=(100 \times A)/(B \times C) \quad \text{[Math. 1]}$$

In the above formula, X is the amount (mol) of the cyclic compound contained in 100 g of the epoxy resin, (A) is the amount (mol) of the cyclic compound per mole of the aromatic ring, (B) is the amount (mol) of the epoxy group per mole of the aromatic ring, and (C) is the epoxy equivalent (g/eq).
Here, (A) was calculated from the ratio of the integration of a peak attributable to the cyclic compound at around 60 ppm to that of a peak attributable to the aromatic ring corresponding to the ipso-position of 1,2,3-trihydroxybenzene at around 130 to 150 ppm in a $^{13}$C NMR measurement. In addition, (B) was calculated from the ratio of the integration of a peak attributable to the epoxy group at around 50 ppm to that of the peak attributable to the aromatic ring at the ipso-position of 1,2,3-trihydroxybenzene at around 130 to 150 ppm. As a result, the content of the cyclic compound was 0.071 mol/100 g. Note that FIG. 1 shows a $^{13}$C NMR chart of the epoxy resin produced in Example 1.
In addition, for the obtained epoxy resin, the proportion of the area of 1,2,3-triglycidyloxybenzene (the triglycidyl form of pyrogallol) was measured in a GPC measurement. As a result, the content of the triglycidyl form of pyrogallol was 79% in terms of the proportion of the area in a GPC measurement.
Furthermore, the proportion of the area of the oligomer was measured in a GPC measurement. As a result, the content of the triglycidyl form of pyrogallol was 3.0% in terms of the proportion of the area in a GPC measurement.
In addition, for the obtained epoxy resin, the epoxy equivalent was measured. Specifically, the epoxy equivalent of the epoxy resin was measured according to the method of JIS K 7236:2009. As a result, the epoxy equivalent of the epoxy resin was 122 g/eq.
Furthermore, the viscosity of the obtained epoxy resin was measured. Specifically, the viscosity of the epoxy resin at 25° C. was measured with an E-type viscometer (TV-22 manufactured by Toki Sangyo Co., Ltd). As a result, the viscosity of the epoxy resin was 2700 mPa·s.
The obtained results are shown in Table 1 below.

<Production of Epoxy Resin Composition>
Under conditions of 100° C. and 2 hours, 30 parts of a curing agent, 4,4'-diaminodiphenyl sulfone, was melt mixed with 70 parts of the above-mentioned epoxy resin to obtain an epoxy resin composition.

<Production of Cured Product>
The epoxy resin composition produced above was poured between glass plates with a 2 mm spacer interposed therebetween and was subjected to a curing reaction at 150° C. for 1 hour and then at 180° C. at 3 hours to produce a cured product.

Example 2

<Production of Epoxy Resin>
An epoxy resin was produced in the same manner as in Example 1 except for changing the time for heating and stirring at 50° C. in the step (1) of Example 1 from 24 hours to 15 hours. Note that, in visual observation of the obtained epoxy resin, the epoxy resin was liquid.
The content of the cyclic compound, the proportion of the area of 1,2,3-triglycidyloxybenzene in a GPC measurement, the proportion of the area of the oligomer in a GPC measurement, the epoxy equivalent of the epoxy resin, and the viscosity of the epoxy resin, which were measured by the same methods as in Example 1, were 0.086 mol/100 g, 77%, 3.2%, 128 g/eq, and 3100 mPa·s, respectively.
The obtained results are shown in Table 1 below.

<Production of Epoxy Resin Composition and Cured Product>
An epoxy resin composition and a cured product were produced in the same manner as in Example 1.

Example 3

An epoxy resin is produced in the same manner as in Example 1 except for changing 11.2 parts (0.06 mol) of benzyltrimethylammonium chloride to 19.3 parts (0.06 mol) of tetrabutylammonium bromide and changing the conditions of heating and stirring from 50° C. and 24 hours to 70° C. and 4 hours. Note that, in visual observation of the obtained epoxy resin, the epoxy resin was liquid.
The content of the cyclic compound, the proportion of the area of 1,2,3-triglycidyloxybenzene in a GPC measurement, the proportion of the area of the oligomer in a GPC measurement, the epoxy equivalent of the epoxy resin, and the viscosity of the epoxy resin, which were measured by the same methods as in Example 1, were 0.101 mol/100 g, 68%, 7.6%, 140 g/eq, and 7400 mPa·s, respectively.

The obtained results are shown in Table 1 below.
<Production of Epoxy Resin Composition and Cured Product>

An epoxy resin composition and a cured product were produced in the same manner as in Example 1.

Example 4

Into a flask equipped with a thermometer, a dropping funnel, a condenser, a nitrogen inlet tube, and a stirrer were added 126 parts (1.00 mol) of 1,2,3-trihydroxybenzene and 1388 parts (15 mol) of epichlorohydrin and the mixture was heated to 50° C. Next, 122 parts of a 49% aqueous NaOH solution was added dropwise over 4 hours. Then, the temperature was increased to 60° C. and 127 parts of a 49% aqueous NaOH solution was added dropwise over 3 hours. After stirring was further continued for 1 hour, 390 mL of distilled water was poured and the mixture was allowed to stand. Then the same operation as in Example 1 was performed to produce an epoxy resin. Note that, in visual observation of the obtained epoxy resin, the epoxy resin was liquid.

The content of the cyclic compound, the proportion of the area of 1,2,3-triglycidyloxybenzene in a GPC measurement, the proportion of the area of the oligomer in a GPC measurement, the epoxy equivalent of the epoxy resin, and the viscosity of the epoxy resin, which were measured by the same methods as in Example 1, were 0.110 mol/100 g, 60%, 11.3%, 160 g/eq, and 18300 mPa·s, respectively.

The obtained results are shown in Table 1 below.
<Production of Epoxy Resin Composition and Cured Product>

An epoxy resin composition and a cured product were produced in the same manner as in Example 1.

Comparative Example 1

An epoxy resin was produced according to the Experimental section of NPL 1. Into a flask equipped with a thermometer, a dropping funnel, a condenser, a nitrogen inlet tube, and a stirrer were put 126 parts (1.00 mol) of 1,2,3-trihydroxybenzene and 1111 parts (12 mol) of epichlorohydrin and the mixture was heated to 100° C. To the mixture, 11.4 parts (0.05 mol) of benzyltriethylammonium chloride was added and the mixture was stirred with heating at 100° C. for 1 hour. Then, the temperature was decreased to 30° C. and 780 parts of a 20% aqueous NaOH solution was added dropwise thereto over 2.5 hours. After stirring was further continued for 1 hour, the mixture was allowed to stand. Then the same operation as in Example 1 was performed to produce an epoxy resin. Note that, in visual observation of the obtained epoxy resin, the epoxy resin was liquid.

The content of the cyclic compound, the proportion of the area of 1,2,3-triglycidyloxybenzene in a GPC measurement, the proportion of the area of the oligomer in a GPC measurement, the epoxy equivalent of the epoxy resin, and the viscosity of the epoxy resin, which were measured by the same methods as in Example 1, were 0.120 mol/100 g, 54%, 13.9%, 184 g/eq, and 53300 mPa·s, respectively.

The obtained results are shown in Table 1 below.
<Production of Epoxy Resin Composition and Cured Product>

An epoxy resin composition and a cured product were produced in the same manner as in Example 1.

Comparative Example 2

The epoxy resin produced in Comparative Example 1 was purified by recrystallization using methyl isobutyl ketone (MIBK) as a good solvent and hexane as a poor solvent to produce an epoxy resin. Note that, in visual observation of the obtained epoxy resin, the epoxy resin was solid.

The content of the cyclic compound, the proportion of the area of 1,2,3-triglycidyloxybenzene in a GPC measurement, the proportion of the area of the oligomer in a GPC measurement, and the epoxy equivalent of the epoxy resin, which were measured by the same methods as in Example 1, were 0.039 mol/100 g, 96%, 0%, and 107 g/eq, respectively. Note that, since this compound was solid, the viscosity of the epoxy resin was not able to be measured.

The obtained results are shown in Table 1 below.

TABLE 1

| | Cyclic compound (mol/100 g) | Triglycidyl form (%*) | Oligomer (%*) | Epoxy equivalent (g/eq) | Viscosity (25° C.) (mPa · s) | Form |
| --- | --- | --- | --- | --- | --- | --- |
| Example 1 | 0.071 | 79 | 3.0 | 122 | 2700 | liquid |
| Example 2 | 0.086 | 77 | 3.2 | 128 | 3100 | liquid |
| Example 3 | 0.101 | 68 | 7.6 | 140 | 7400 | liquid |
| Example 4 | 0.110 | 60 | 11.3 | 160 | 18300 | liquid |
| Comparative Example 1 | 0.120 | 54 | 13.9 | 184 | 53300 | liquid |
| Comparative Example 2 | 0.039 | 96 | 0 | 107 | — | solid |

*GPC area proportion

[Evaluation of Physical Properties]

For the cured products obtained in Examples 1 to 4 and Comparative Example 1, the physical properties were evaluated.

(5% Weight Reduction Temperature)

The 5% weight reduction temperature was measured with a simultaneous thermal analysis apparatus (TGA/DSC1 manufactured by METTOLER TOLEDO, amount of sample: 6 to 6.5 mg, aluminum sample pan size: ϕ5×2.5 mm, rate of temperature increase: 10° C./min, flow rate of nitrogen: 100 ml/min, temperature range: 40 to 600° C.). The obtained results are shown in Table 2 below.

(Glass Transition Point)

Using a viscoelasticity measurement apparatus (DMA: solid viscoelasticity measurement apparatus, RSAII, manufactured by Rheometric, rectangular tension method; frequency: 1 Hz, rate of temperature increase: 3° C./min, maximum measurement temperature: 350° C.), a temperature at which the loss tangent, which is the ratio of the loss modulus to the storage modulus, was the maximum value (the value of tan δ was the largest) was measured for each cured product, and the temperature was recorded as the glass transition temperature (Tg). The obtained results are shown in Table 2 below.

(Bending Strength, Bending Modulus, Bending Strain, Bending Toughness)

The bending strength, the bending modulus, and the bending strain of each cured product were measured according to JIS K7171. In addition, the integration of an S-S curve obtained by a bending test was taken to calculate the energy, and the energy per unit area of a test piece was taken as the bending toughness. The obtained results are shown in Table 2 below.

TABLE 2

| | 5% weight reduction temperature (° C.) | Glass transition point (Tg) (° C.) | Bending strength (MPa) | Bending modulus (MPa) | Bending strain (%) | Bending toughness (MPa) |
|---|---|---|---|---|---|---|
| Example 1 | 350 | 241 | 190 | 4400 | 6.6 | 7.8 |
| Example 2 | 342 | 227 | 181 | 4300 | 6.1 | 6.8 |
| Example 3 | 339 | 207 | 185 | 4500 | 6.0 | 7.0 |
| Example 4 | 328 | 180 | 172 | 4600 | 4.5 | 4.6 |
| Comparative Example 1 | 322 | 155 | 190 | 5000 | 5.0 | 5.9 |

As can be seen from Table 2, the cured products obtained in Examples 1 to 4 had a high 5% weight reduction temperature and a high thermal resistance.

The invention claimed is:

1. An epoxy resin comprising a reaction product of 1,2,3-trihydroxybenzene and an epihalohydrin,
   the epoxy resin containing a cyclic compound that has a cyclic structure containing, as constitutional atoms, two adjacent oxygen atoms derived from 1,2,3-trihydroxybenzene,
   the cyclic compound being contained in an amount of 0.040 to 0.115 mol based on 100 g of the epoxy resin.

2. The epoxy resin according to claim 1, wherein the epoxy resin has an epoxy equivalent of 170 g/eq or less.

3. The epoxy resin according to claim 1, wherein the epoxy resin further contains 1,2,3-triglycidyloxybenzene, the 1,2,3-triglycidyloxybenzene being contained in an amount of 55% or more in terms of a proportion of an area in a GPC measurement.

4. The epoxy resin according to claim 1, wherein the epoxy resin further contains an oligomer,
   the oligomer being contained in an amount of 12% or less in terms of a proportion of an area in a GPC measurement.

5. An epoxy resin composition comprising the epoxy resin according to claim 1 and a curing agent.

6. A cured product produced by curing the epoxy resin composition according to claim 5.

* * * * *